(12) United States Patent
Hegyi et al.

(10) Patent No.: US 10,760,967 B2
(45) Date of Patent: Sep. 1, 2020

(54) LIQUID CRYSTAL FOURIER TRANSFORM IMAGING SPECTROMETER

(71) Applicant: Palo Alto Research Center Incorporated, Palo Alto, CA (US)

(72) Inventors: Alex Hegyi, San Francisco, CA (US); Joerg Martini, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 71 days.

(21) Appl. No.: 14/883,404

(22) Filed: Oct. 14, 2015

(65) Prior Publication Data

US 2016/0123811 A1 May 5, 2016

Related U.S. Application Data

(63) Continuation-in-part of application No. 14/527,347, filed on Oct. 29, 2014, and a continuation-in-part of application No. 14/527,378, filed on Oct. 29, 2014.

(51) Int. Cl.
*G01J 3/28* (2006.01)
*G02F 1/1335* (2006.01)
(Continued)

(52) U.S. Cl.
CPC ........... *G01J 3/2823* (2013.01); *G01J 3/0224* (2013.01); *G01J 3/0256* (2013.01); *G01J 3/0272* (2013.01);
(Continued)

(58) Field of Classification Search
CPC ...... G01J 3/2823; G01J 3/0256; G01J 3/0272; G01J 3/4531; G01J 3/4537; G01J 3/45;
(Continued)

(56) References Cited

U.S. PATENT DOCUMENTS

| 4,342,516 A | 8/1982 | Chamran et al. |
| 4,812,657 A | 3/1989 | Minekane |

(Continued)

OTHER PUBLICATIONS

Itoh, K., et al., "Liquid-crystal imaging Fourier-spectrometer array," Optics Letters, 15:11, 652-654, Jun. 1, 1990.

(Continued)

*Primary Examiner* — Hwa Andrew Lee
(74) *Attorney, Agent, or Firm* — Mueting Raasch Group

(57) ABSTRACT

A hyperspectral imaging system has a processor to receive hyperspectral imaging parameters and produce a series of images to be acquired at a series of retardances at a series of retardance times, a hyperspectral imaging component having an input polarizer to polarize an incoming beam of light, a liquid crystal variable retarder to receive the polarized beam of light and to produce wavelength-dependent polarized light, an output polarizer to receive the wavelength-dependent polarized light and to convert polarization state information into a form detectable as light intensity, a voltage source connected to the liquid crystal variable retarder, and a retardance controller. The retardance controller receives the series of retardances at a series of retardance times and produces a series of voltages at a series of voltage times to apply to the liquid crystal variable retarder. A focal plane array, synchronized with the retardance controller, receives the light in a form detectable as light intensity and converts the light to a series of images.

2 Claims, 20 Drawing Sheets

(51) Int. Cl.
  *G02F 1/137* (2006.01)
  *G02F 1/141* (2006.01)
  *G01J 3/02* (2006.01)
  *H04N 5/225* (2006.01)
  *G01J 3/45* (2006.01)
  *G01J 3/453* (2006.01)
  *G01J 3/447* (2006.01)

(52) U.S. Cl.
  CPC .............. *G01J 3/447* (2013.01); *G01J 3/45* (2013.01); *G01J 3/4531* (2013.01); *G01J 3/4537* (2013.01); *G02F 1/137* (2013.01); *G02F 1/133528* (2013.01); *G02F 1/141* (2013.01); *H04N 5/2254* (2013.01); *G02F 2001/13355* (2013.01); *G09G 2310/08* (2013.01)

(58) Field of Classification Search
  CPC .. G01J 3/0224; G02F 1/133528; G02F 1/141; G02F 1/137; G02F 2001/13355; H04N 5/2254; G09G 2310/08
  See application file for complete search history.

(56) References Cited

U.S. PATENT DOCUMENTS

| | | | |
|---|---|---|---|
| 4,848,877 A | | 7/1989 | Miller |
| 4,905,169 A | * | 2/1990 | Buican ............... G01J 3/447 356/327 |
| 5,247,378 A | * | 9/1993 | Miller ............... G02F 1/13306 349/18 |
| 5,347,382 A | * | 9/1994 | Rumbaugh ......... G02F 1/13471 349/18 |
| 5,619,266 A | | 4/1997 | Tomita et al. |
| 5,642,214 A | | 6/1997 | Ishii |
| 5,784,162 A | | 7/1998 | Cabib et al. |
| 5,856,842 A | | 1/1999 | Tedesco |
| 5,953,083 A | | 9/1999 | Sharp |
| 6,169,594 B1 | | 1/2001 | Aye et al. |
| 6,421,131 B1 | * | 7/2002 | Miller ............... G01J 3/447 356/453 |
| 6,552,836 B2 | | 4/2003 | Miller |
| 6,576,886 B1 | | 7/2003 | Yao |
| 6,774,977 B1 | | 8/2004 | Walton et al. |
| 6,778,251 B1 | * | 8/2004 | Austin ............. G02F 1/133382 349/139 |
| 7,067,795 B1 | | 6/2006 | Yan et al. |
| 7,116,370 B1 | | 10/2006 | Huang |
| 7,196,847 B2 | | 3/2007 | Ye |
| 7,339,665 B2 | | 3/2008 | Imura |
| 7,999,933 B2 | | 8/2011 | Mcclure |
| 8,422,119 B1 | | 4/2013 | Keaton |
| 9,631,973 B2 | | 4/2017 | Dorschner |
| 2004/0036876 A1 | | 2/2004 | Davis et al. |
| 2004/0165101 A1 | | 8/2004 | Miyanari et al. |
| 2005/0190329 A1 | | 9/2005 | Okumura |
| 2006/0056029 A1 | | 3/2006 | Ye |
| 2006/0187974 A1 | | 8/2006 | Dantus |
| 2006/0279732 A1 | | 12/2006 | Wang |
| 2007/0003263 A1 | | 1/2007 | Nomura |
| 2007/0070354 A1 | | 3/2007 | Chao et al. |
| 2008/0158550 A1 | | 7/2008 | Arieli et al. |
| 2008/0212874 A1 | | 9/2008 | Steib |
| 2008/0266564 A1 | | 10/2008 | Themelis |
| 2008/0278593 A1 | | 11/2008 | Cho et al. |
| 2009/0284708 A1 | | 11/2009 | Abdulhalim |
| 2010/0056928 A1 | | 3/2010 | Zuzak |
| 2011/0012014 A1 | | 1/2011 | Livne et al. |
| 2011/0170098 A1 | | 7/2011 | Normand |
| 2011/0273558 A1 | | 11/2011 | Subbiah et al. |
| 2011/0279744 A1 | | 11/2011 | Voigt |
| 2011/0299089 A1 | | 12/2011 | Wang et al. |
| 2012/0013722 A1 | | 1/2012 | Wong et al. |
| 2012/0013922 A1 | | 1/2012 | Wong et al. |
| 2012/0268745 A1 | | 10/2012 | Kudenov |
| 2012/0300143 A1 | | 11/2012 | Voigt |
| 2013/0010017 A1 | | 1/2013 | Kobayashi et al. |
| 2013/0027516 A1 | | 1/2013 | Hart |
| 2013/0107260 A1 | | 5/2013 | Nozawa |
| 2014/0125990 A1 | | 5/2014 | Hinderling et al. |
| 2014/0257113 A1 | | 9/2014 | Panasyuk et al. |
| 2014/0354868 A1 | | 12/2014 | Desmarais |
| 2014/0362331 A1 | | 12/2014 | Shi |
| 2015/0022809 A1 | | 1/2015 | Marchant et al. |
| 2015/0086117 A1 | | 3/2015 | Comstock, II et al. |
| 2015/0168210 A1 | | 6/2015 | Dorschner |
| 2015/0185081 A1 | | 7/2015 | Sano et al. |
| 2015/0206912 A1 | | 7/2015 | Kanamori |
| 2016/0123811 A1 | | 5/2016 | Hegyi et al. |
| 2016/0127660 A1 | | 5/2016 | Hegyi et al. |
| 2016/0127661 A1 | | 5/2016 | Hegyi et al. |
| 2017/0264834 A1 | | 9/2017 | Hegyi et al. |
| 2017/0264835 A1 | | 9/2017 | Hegyi et al. |

OTHER PUBLICATIONS

File History for U.S. Appl. No. 14/527,347.
File History for U.S. Appl. No. 14/527,378.
File History for U.S. Appl. No. 15/605,642.
File History for U.S. Appl. No. 15/605,625.
File History for U.S. Appl. No. 15/858,354.
Office Action dated Aug. 8, 2018 from CN Application No. 201510710643.X, 16 pages.
File History for EP App. No. 15190915.7 as retrieved from the EP Patent Office Electronic System on Sep. 25, 2018, 306 pages.
U.S. Appl. No. 15/827,204, filed Nov. 30, 2017.
U.S. Appl. No. 15/858,338, filed Dec. 29, 2017.
U.S. Appl. No. 15/858,354, filed Dec. 29, 2017.
U.S. Appl. No. 15/858,368, filed Dec. 29, 2017.
U.S. Appl. No. 15/858,609, filed Dec. 29, 2017.
Hegyi et al., "Hyperspectral imaging with a liquid crystal polarization interferometer", Optics Express, vol. 23, No. 22, 13 pages, Oct. 26, 2015.
Jullien et al., "High-resolution hyperspectral imaging with cascaded liquid crystal cells", Optica, Vo. 4, No. 4, pp. 400-405, Apr. 2017.
Li et al., "GPU accelerated parallel FFT processing for Fourier transform hyperspectral imaging", Applied Optics, vol. 54, No. 13, pp. D91-D99, May 1, 2015.
Persons et al., "Automated registration of polarimetric imagery using Fourier transform techniques", Proceedings of SPIE, vol. 4819, 2002.
Porter et al., "Correction of Phase Errors in Fourier Spectroscopy", International Journal of Infrared and Millimeter Waves, vol. 4, No. 2, 273-298, 1983.
Smith et al., "Increased acceptance bandwidths in optical frequency conversion by use of multiple walk-off-compensating nonlinear crystals". J. Opt. Soc. Am. B/ vol. 15, No. 1, Jan. 1998.

* cited by examiner

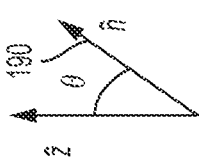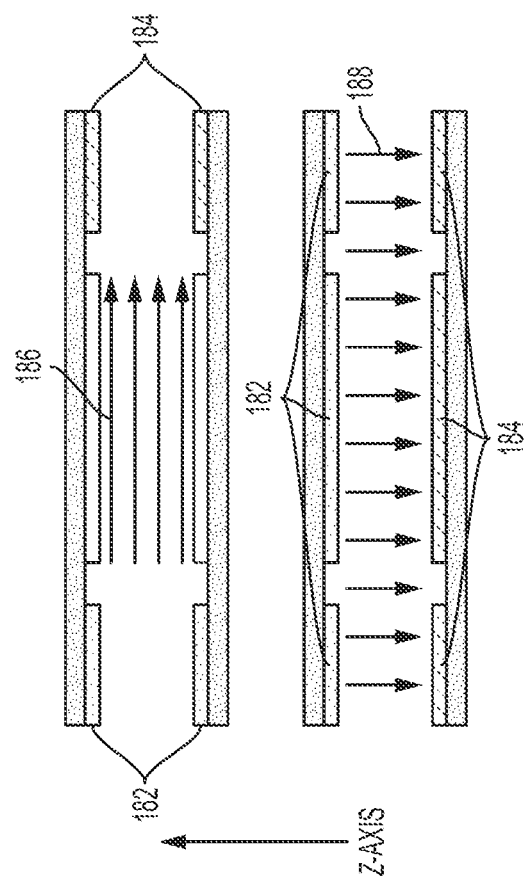
FIG. 21

LIQUID CRYSTAL FOURIER TRANSFORM IMAGING SPECTROMETER

RELATED APPLICATIONS

This application is a continuation-in-part of, and claims priority to, U.S. patent application Ser. Nos. 14/527,347, and 14/527,378, filed Oct. 29, 2014, which are incorporated herein in their entirety.

BACKGROUND

Hyperspectral imaging (HSI) collects and processes information from across the ultraviolet (UV), visible, and infrared portions of the electromagnetic spectrum. A hyperspectral imaging camera obtains hyperspectral image data or HSI data which consists of spectral information at each point in a scene. HSI is frequently employed to increase the depth of information in a scene's image, or to increase the image's visual contrast beyond what can be recorded with a conventional monochrome or color camera. This enhanced contrast can be used to detect hard to find or camouflaged objects obscured by visual noise; it can also aid in materials identification. It can be used to assess detailed information about the state of a subject, such as the ripeness of a piece of fruit. Well-known applications of HSI abound for domains as diverse as industrial and agricultural sorting, remote sensing for agriculture and defense, threat identification, and even medicine.

The advent of smartphone technology has provided powerful, mobile platforms that a significant fraction of the world's population carries on their person at most times. There is a trend toward increasing the number and types of sensors present on smartphones, and the computing power of these phones is correspondingly increasing. Smartphones already include multiple image sensors, but they are not currently thought of as candidates for HSI cameras because of the prohibitive size and cost of existing HSI technologies.

SUMMARY

An embodiment is a hyperspectral imaging system, including a processor to receive hyperspectral imaging parameters and to convert the imaging parameters to a series of images to be acquired at a series of retardances at a series of retardance times, a hyperspectral imaging component having at least one input polarizer, wherein the input polarizer receives and polarizes an incoming beam of light, a liquid crystal variable retarder arranged adjacent the input polarizer opposite the incoming beam of light to receive the polarized beam of light from the input polarizer and to change polarization of the light to produce wavelength-dependent polarized light, an output polarizer arranged to receive the wavelength-dependent polarized light and to convert polarization state information of the light into a form detectable as light intensity, a voltage source electrically connected to the liquid crystal variable retarder, and a retardance controller, the controller to receive the series of retardances at a series of retardance times and to produce a series of voltages at a series of voltage times to be applied to the liquid crystal variable retarder, and a focal plane array synchronized with the retardance controller to receive the light in a form detectable as light intensity as a function of retardance of the liquid crystal variable retarder and convert the light to an output signal as a series of images, wherein the processor performs transformations of the series of images to hyperspectral image data.

Another embodiment is a method of producing hyperspectral image data, including receiving a set of hyperspectral imaging parameters at a processor, generating, with the processor, a series of retardances at a series of retardance times corresponding to the hyperspectral imaging parameters, sending the series of retardances at the series of retardance times to a retardance controller, generating, with the retardance controller, a series of voltages at a series of voltage times to be applied to a liquid crystal variable retarder, applying the series of voltages at the series of voltage times to a liquid crystal variable retarder, capturing a series of images through the liquid crystal variable retarder with a focal plane array, and using the processor to generate hyperspectral image data from the series of images.

BRIEF DESCRIPTION OF THE DRAWINGS

FIG. 21 shows a diagram of a two-component electric field.

DETAILED DESCRIPTION OF THE EMBODIMENTS

Figure 1:
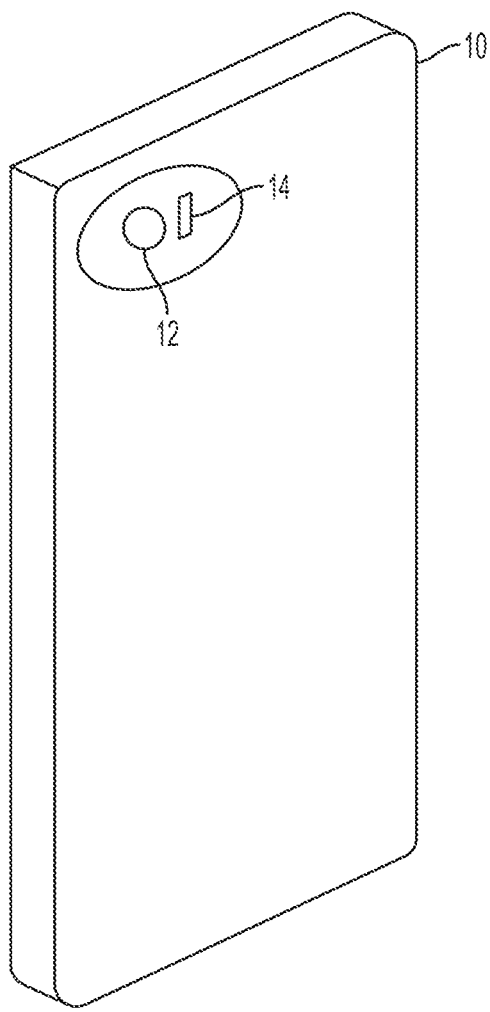
FIG. 1 shows a first view of a device containing a hyperspectral imaging camera.

Hyperspectral imaging has many promising use cases such as for sorting, remote sensing and medical applications. The cost, size, and usability of this technology have limited the applications. If one could include a hyperspectral imaging camera into many common systems, hyperspectral imaging (HSI) could become much more widespread. For example, smartphones are readily available technology platforms for HSI cameras. Inclusion on the smartphone could push the boundaries of what is possible with HSI, as the smartphone is a general-purpose platform carried by most individuals for which it is easy to develop new applications.

A current state-of-the-art HSI camera might work by scanning a slit across a scene and dispersing the light transmitted through the slit via a grating. Or, it might work by placing liquid crystal tunable filters in front of a focal plane array that allow instantaneous imaging at one wavelength band. As used in this discussion, the term focal plane array, or FPA, is one or more light sensing elements arranged in an array, where an array could be an array of one. Examples of FPAs include charge-coupled devices (CCDs), CMOS image sensors, etc. Light emanating from a scene falls upon the FPA and generates signals that are processed to produce an image of the scene. Lower-cost hyperspectral imaging cameras might tile optical bandpass filters on the focal plane array itself, similar to existing red-green-blue cameras but with more discrete optical bands, trading off spatial resolution for greater spectral resolution. While liquid crystal tunable filters and optical bandpass filters allow one to obtain an image in a given wavelength band immediately, they do this at the expense of discarding all out-of-band wavelengths.

Typically, one wants to image a scene over a range of wavelengths. It is therefore desirable to record light from all the wavelengths at once, rather than only from one spectral band at a time. This can be achieved using optically multiplexed forms of hyperspectral imaging, such as Fourier transform hyperspectral imaging, which encodes wavelength information into a time signal that is recorded by a detector. Any optically multiplexed technique, such as those exemplified in the current embodiments, has gains in optical throughput, a feature known as Fellgett's advantage.

Systems that use gratings and two-dimensional focal plane arrays, also known as dispersive systems, can record light from all wavelengths within a given band and along one spatial axis simultaneously. Spatial information along the other spatial axis is built up by scanning a slit over the object to be imaged in a pushbroom manner. Spatial information is instantaneously obtained in the long direction of the slit and the short direction is dispersed in wavelength with a grating or prism so the FPA can record all of the wavelengths at once. Spatial information in the short direction of the slit is collected as the slit is scanned in time across the object. Dispersive systems are often high in cost, size, or complexity. The embodiments here do not incur these penalties because they merely add a controllable liquid crystal variable retarder in the optical path before the FPA. In addition, the use of a slit in dispersive systems restricts the total optical throughput at any given time to the light that passes through the slit. By foregoing the use of slits, Fourier transform hyperspectral imaging systems and other multiplexed systems gain a throughput advantage known as the Jacquinot advantage.

The conventional way to perform Fourier transform hyperspectral imaging is to use an imaging Michelson interferometer, which is a device that splits an imaging path into two arms, and that varies the length of one of the arms while recording the recombined light on a FPA. This kind of HSI gains from both the Fellgett and Jacquinot advantages, but it is bulky, costly, and sensitive to vibration and misalignment. The current embodiments suffer from none of these drawbacks.

The embodiments here enable a new class of HSI cameras that have the potential to be extremely small and low-cost, and are capable of being integrated anywhere cameras are currently used, including on smartphones. The embodiments have advantages in a general-purpose host platform like a smartphone because performance parameters such as wavelength resolution, imaging speed, and spatial resolution can be selected in software and are not fixed by the hardware configuration. The HSI components described in the embodiments here can be operated in conjunction with existing camera components of the host system, such as FPAs, optics, and processors, to form an HSI camera in combination. The HSI components and the camera components of the host system can be triggered with the same camera button, and the HSI components can be configured in software to allow the camera components of the host system to take normal, non-hyperspectral images. The embodiments leverage the increasing prevalence of computing power by shifting most of the system complexity to the electronic/software side, therefore keeping overall system cost low.

In addition, the use of a smartphone or other portable device having wireless or wired communications capability allows the device to communicate the raw HSI data. Alternatively, the device would transmit the analyzed or processed HSI data for use with larger devices, such as medical equipment, or as part of a diagnostic routine.

A portable device-based HSI camera enables current applications of HSI at the consumer level. More importantly, as HSI becomes widely deployed on a mobile platform and as mobile app developers learn to exploit the capabilities of HSI, they undoubtedly will uncover novel and interesting uses for HSI.

The following discussion uses several terms having the following definitions. A "liquid crystal variable retarder" refers to at least one liquid crystal (LC) cell, comprising liquid crystal material sandwiched between two transparent, typically glass, substrates. Transparent electrode layers deposited on the glass substrates, typically made of a transparent conductor such as indium tin oxide or ITO, provide for the generation of an electric field within the liquid crystal cell, which is used to vary the orientation of the liquid crystal molecules and hence the optical retardance of the liquid crystal variable retarder. Additional layers may be provided interior to the cell, such as polyimide alignment layers deposited on the electrode layer that are rubbed in a preferred alignment direction to orient the liquid crystal molecules. Instead of a single LC cell comprising the liquid crystal variable retarder, there may be several.

A "hyperspectral imaging component" or "HSI component" refers to a component having an input polarizer or polarizing device, a liquid crystal variable retarder, an output polarizer or analyzer, a retardance controller and a voltage source. The input polarizer is between the LC variable retarder and the source of light. The output polarizer resides on the side of the LC variable retarder opposite the first polarizer. The retardance controller controls the voltages applied to the LC variable retarder to achieve a desired retardance of light passing through the LC retarder.

A "hyperspectral imaging system" or "HSI system" refers to a combination of the HSI component, a focal plane array as defined above, and a processor. The processor may reside in a stand-alone device, meaning a device that contains all of the elements of the system including the processor and the FPA, and functions independently of a host. Alternatively, the processor and/or the FPA may be components of a host system, with all of the associated combinations. A "host system" or "host" is an optional device that sends HSI parameters to an HSI camera or an HSI system and receives HSI data in return. An "HSI camera" is an HSI system with the necessary optics to record an image.

Figure 2:
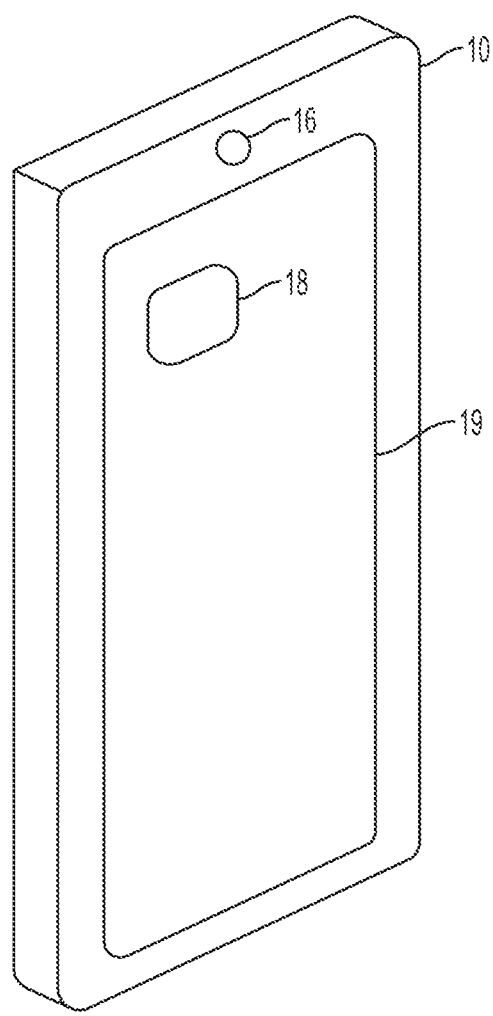
FIG. 2 shows a second view of a device containing a hyperspectral imaging camera.

An example of a device that is a host system having an HSI component (LC variable retarder, retardance controller and voltage source) is shown in FIGS. 1 and 2. In FIG. 1, a smartphone device 10 is shown as the host device. One must note that while this particular device is shown and may be discussed, no limitation to this type of device is intended or should be implied. Other types of devices that can employ the HSI component include periscopes, optical fluorescence detection systems, telescopes, microscopes, endoscopes, fiber bundle imaging systems, lightfield imaging systems, and still cameras, line camera, and video cameras. In FIG. 1, the HSI component would be in the path of the aperture 12, and the imaged scene may be illuminated with a light 14.

FIG. 2 shows the display side of the smartphone 10. The display side shows the display screen 19 with an example application 18 that would trigger the use of the HSI component. Without the application triggering the HSI component, the HSI component would be inactive, allowing normal (color or monochrome) use of the camera without HSI. The camera 16 that points at the user may also be endowed with an HSI component. A forward-facing cell-phone HSI camera may be especially useful for users to generate HSI data for applications such as medical imaging, etc.

In certain embodiments of the HSI component, the optical axis of the LC variable retarder is nominally at 45 degrees with respect to the polarizers. For a given wavelength of incident light that passes through the input polarizer, the HSI component oscillates between transmitting and not transmitting the light as the optical retardation increases. This oscillation occurs because the LC variable retarder periodically alters the polarization state of the light as the retardance increases, and the output polarizer functions to alternately block or pass the light after the retarder based on its polarization state. Retardance may be described as optical path delay or optical phase delay, as discussed below, where optical phase delay is proportional to the optical path delay divided by the wavelength.

The intensity oscillations as a function of optical retardance, collectively called the interferogram, occur with a period that depends on the incident wavelength. Each unique incident wavelength oscillates in intensity as a function of retardance at a different rate, and the intensity oscillations from a combination of incident wavelengths sum together linearly. The wavelengths can be separated by Fourier transform of the received light as a function of optical retardance, in this case optical path delay, yielding an optical spectrum. Since the liquid crystal variable retarder is placed in the optical path of the focal plane array, the FPA can independently sample and record the intensity oscillations or interferogram at each point in an image and use this information to calculate hyperspectral image data.

The spectral resolution $\Delta\lambda$ at each wavelength $\lambda$ and each point in the hyperspectral image data is given by the formula, $\Delta\lambda=2\pi\lambda/\Delta\phi$, where $\Delta\phi$ is the range of optical phase delays at which the interferogram is recorded, expressed in radians. From this formula it is apparent that to resolve wavelength differences significantly smaller than the center wavelength, interferograms must be recorded with ranges of optical phase delay $\Delta\phi>>2\pi$. This requirement differentiates the current embodiments from liquid crystal tunable filters that typically do not need to scan the phase delays of their constituent liquid crystal stages beyond a range of $2\pi$. Furthermore, the range of phase delay is a function of wavelength $\lambda$, liquid crystal birefringence $\Delta n$, and position-dependent effective thickness of the liquid crystal layers $\beta$, expressed with the following equation: $\Delta\phi=2\pi\Delta n(\lambda,T,V)\beta(x,y)/\lambda$. Here, birefringence is a function of wavelength, temperature T, and time-dependent liquid crystal voltage V, and expresses the birefringence between two rays normally incident to the liquid crystal variable retarder with ordinary and extraordinary polarization. The change in incidence angle of the chief ray with position of a given pixel on the FPA and the corresponding position dependence of the optical phase delay range are incorporated into the position-dependent effective thickness $\beta$.

Figure 3:
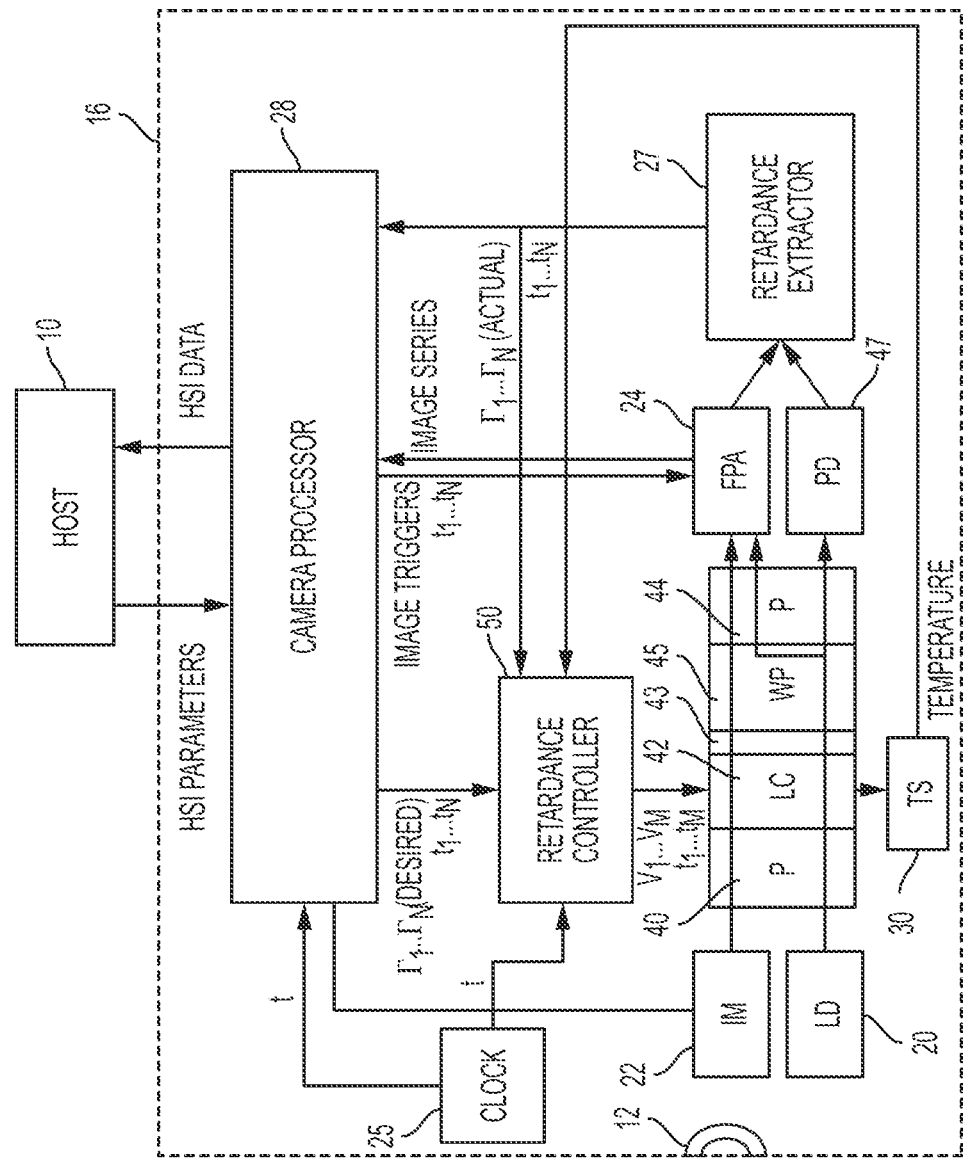
FIG. 3 shows a schematic of a device including a hyperspectral imaging camera.

FIG. 3 shows an internal schematic of a hyperspectral camera such as 16 that includes an HSI component and may be in communication with a host device 10. A host device may be a smartphone, a personal computer, a tablet, a handheld camera, or other system capable of issuing parameters for hyperspectral image data such as wavelength resolution, exposure time, and exposure trigger, and receiving said hyperspectral image data. Alternatively, the camera may be self-contained with its own processor and therefore capable of functioning independent of a host. Light enters the HSI camera through the aperture 12 and enters the optics 22, which then transfer the light to the FPA 24. The FPA converts the received light into a signal that can be processed by the processor 28. In the embodiments where the HSI component is used in conjunction with a host device, the processor 28 and the FPA 24 may be parts of the host device. The processor in this embodiment is the processor for the camera 16. For purposes of this discussion, the processor 28 will be considered separate from the processor of the host system 10. However, one must note that the processor 28 may be a partition of the host processor, a dedicated processor, etc. No limitation is intended, nor should any be implied, as to a particular arrangement of the processors in the overall system.

The optics 22 may include a relay lens or other relay optical device as will be discussed in more detail later. The optics may also include an imaging lens. Typically, imaging lenses are fixed relative to the FPA. However, as the HSI camera may consist of or be present on a handheld device, the imaging lens may be movable or the device may have other optical techniques to allow for image stabilization that would compensate for unintended hand movement. Other optical elements may be included in the optics or elsewhere in the system, such as a chromatic compensation device. The optics may be under control of processor 28.

Alternatively, the processor may receive the output signal from the FPA and perform image stabilization on the output signals. The output signals will typically represent frames of image data detected by the FPA with each frame acquired at a particular retardance state of the liquid crystal variable retarder. The processor may receive at least two output signals from the FPA, each representing a frame of image data detected at the FPA. Ideally, there is no relative motion between a scene or objects in a scene and the FPA during the acquisition of output signals corresponding to a single HSI dataset. However, because this case of no relative motion is not always practical, the processor may perform an image analysis to determine and apply registration of regions of the image or of objects in the image, compensating such motion. This compensation may eliminate or mitigate the imaging artifacts of images captured while the system is unstable, images of moving objects, and even relative scene motion caused by the beam walk-off phenomenon, to be described subsequently.

After passing through the imaging optics 22, the light travels through an input polarizer 40, the liquid crystal variable retarder 42, an optional compensation layer 43, an optional waveplate 45, and an output polarizer or analyzer 44. The light then strikes the FPA 24. The light may take a second path to a photodetector 47. In some embodiments, the resulting detection signals are extracted by a retardance extractor 27 and sent to the processor 28 and the retardance controller 50. The retardance extractor can extract the retardance of the liquid crystal variable retarder from signals generated by the photodetector 47, or the FPA 24, or both. It can consist of a separate electronic circuit or processor, or it can be a function that resides within the camera processor 28. The detection signals are generally sent directly to the processor 28 from the FPA 24 so they can be processed into hyperspectral image data before being sent to the requesting system or host, if there is one. In addition, as will be discussed in more detail later, the liquid crystal variable retarder may include a temperature sensor, such as a thermometer, 30. Such a thermometer can be fabricated within a LC cell of the LC variable retarder by patterning a thermistor into the electrode. It also may be a thermistor or a similar electronic component that is in thermal contact, meaning that the component is thermally connected, with the LC variable retarder or that senses the approximate temperature of one or more LC cells. The HSI data is acquired by processing multiple images taken by the camera at multiple times and multiple retardances provided by the liquid crystal variable retarder under the control of the retardance controller.

As mentioned above, optional elements of the HSI imager may consist of a waveplate 45, and a retardance or phase compensation layer or compensator such as 43. A waveplate allows for phase shifting between the polarization components to allow alteration of the polarization of the light. A retardance, or phase compensation layer applies a static path delay at each point in an image, enabling sampling of a different portion of the interferogram than would normally be sampled by applying a voltage waveform to the liquid crystal variable retarder. One embodiment of such a compensation layer would achieve net zero retardance in combination with the liquid crystal variable retarder when the HSI component is inactive, and could additionally be designed to compensate for non-zero retardance at any, some, or all wavelengths of interest. This would prevent the HSI component from interfering with the normal non-hyperspectral operation of a camera.

Another kind of compensation layer would consist of multiple regions of different path delays tiled across the FPA. An example compensation layer consists of two regions, one of path delay 0 and the other of path delay D. If a LC variable retarder can generate path delays from 0 to D, the region of the image corresponding to the region of the compensation layer with path delay 0 will produce an interferogram with path delay from 0 to D, whereas the other region will produce an interferogram with path delay from D to 2D. If a special lens were used that produced a duplicate image of a scene with one image per compensation layer region, then an interferogram of this scene with path delay from 0 to 2D could be formed in software by stitching together the two image duplicates acquired at different path delay ranges. This would provide hyperspectral image data with twice the spectral resolution of an interferogram with path delay from 0 to D yet it would be measured in half the time; however, the image would have half the spatial resolution in one dimension. In general, such retardance compensation layers offer a means of trading off spatial and spectral resolution and imaging speed.

If a specific retardance is required during an extended period of time, for example holding the retardance at 0 for traditional non-hyperspectral imaging, the retardance of the variable retarder could be set to a desired value and maintained at that value over time. In another modality, an effective retardance could be accomplished over time by continuously varying the retardance in such manner that the average retardance over time is the desired one.

Figure 4:
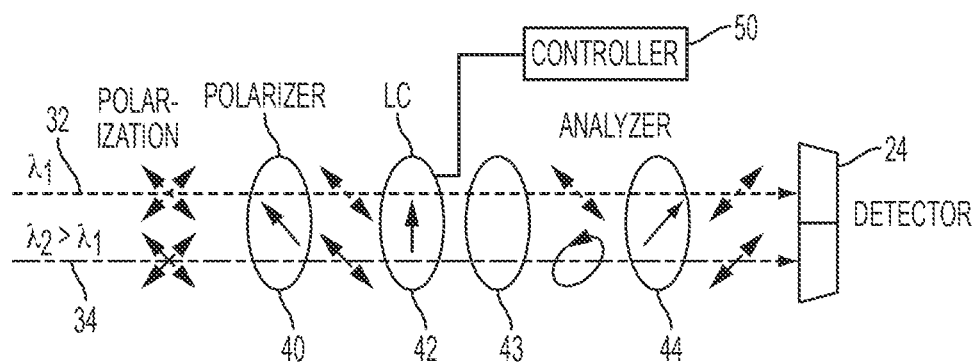
FIG. 4 shows a ray diagram of a hyperspectral imaging system optical path.

The HSI component may have many different configurations. FIG. 4 shows one example. In the embodiment shown in FIG. 4, two unpolarized, collimated, monochromatic beams of light 32 and 34 are depicted, with the upper beam having a shorter wavelength $\lambda_1$ than the lower beam, $\lambda_2$. The optical path has an input polarizer 40 that polarizes incident light. The liquid crystal variable retarder 42 has an alignment orientation 45 degrees with respect to the input polarizer.

Figure 5:
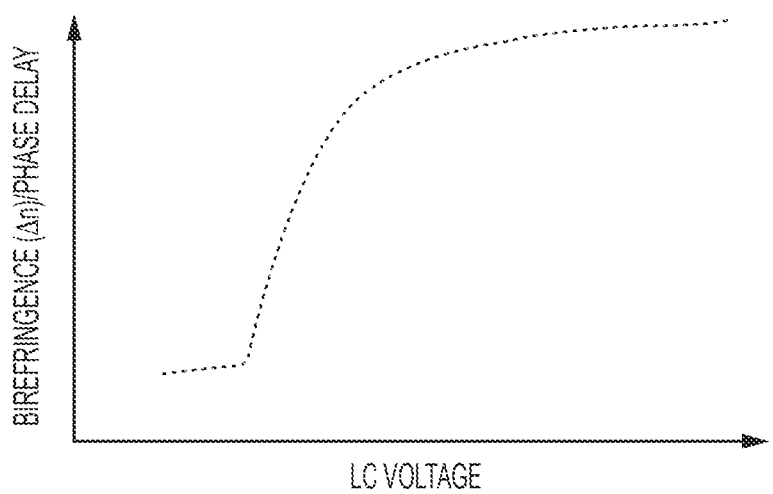
FIG. 5 shows a graph of the equilibrium phase delay versus liquid crystal voltage.

As shown in FIG. 5, each voltage applied to the liquid crystal variable retarder 42 produces a characteristic birefringence or optical phase delay as measured between the polarization component parallel to the liquid crystal variable retarder's slow axis with respect to the component that is perpendicular to the liquid crystal variable retarder's slow axis. The plot in FIG. 5 shows the equilibrium phase delay of a liquid crystal variable retarder as a function of voltage, that is, the phase delay obtained at a given voltage after allowing the liquid crystal to fully relax at that voltage. The liquid crystal variable retarder has a controller that applies a time-dependent voltage waveform to one or more electrodes on its constituent LC cells. This voltage waveform can be chosen to cause the optical phase delay to change at a nominally constant rate over time for a given wavelength. Or, it can be chosen to cause the retarder to be at specified retardances at specified times. An output polarizer or analyzer 44 converts the variations in polarization induced by the liquid crystal variable retarder to variations in light intensity. One or more of the polarizers may consist of a wire grid polarizer.

Figure 6:
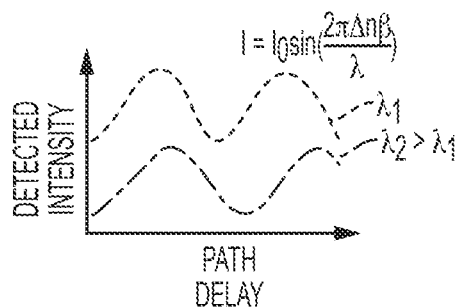
FIG. 6 shows a graph of detected intensity versus path delay.
Figure 7:
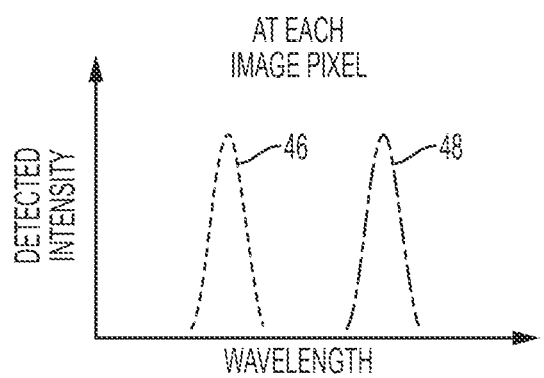
FIG. 7 shows a graph of detected intensity at each image pixel versus wavelength.

The resulting time-dependent variations in intensity are picked up by the focal plane array such as 24, with the detected intensity versus path delay shown in FIG. 6 and the detected intensity versus wavelength shown in FIG. 7. The upper curve of FIG. 6 corresponds to the detected intensity variations of the shorter wavelength ray 32 in FIG. 4, while the lower curve of FIG. 6 corresponds to the detected intensity variations of the longer wavelength ray 34. Similarly, the peak 46 in FIG. 7 corresponds to the shorter wavelength ray 32 while the peak 48 corresponds to the longer wavelength ray 34.

Some embodiments achieve retardance through high optical path delays between the two polarization components while maintaining low liquid crystal driving voltages and/or fast liquid crystal response times. As is known in the art of Fourier transform spectroscopy, high optical path delays yield high spectral resolution, and are therefore beneficial.

Figure 8:
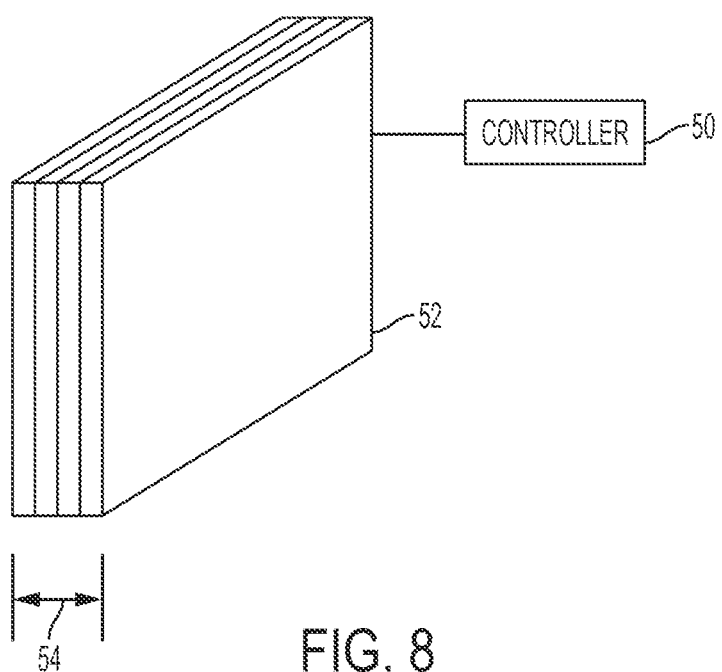
FIG. 8 shows an embodiment of a liquid crystal variable retarder consisting of multiple, stacked liquid crystal cells.

However, a high optical path delay generally implies a greater total thickness of liquid crystal. To keep the driving voltages and response times low, a single thick liquid crystal cell can be broken up into multiple cells in series, as shown in FIG. 8.

The liquid crystal response time for an individual cell at a given voltage scales as the square of the cell thickness, so two liquid crystal variable retarders with identical path delay, one consisting of a single cell, and one split into two cells, would have a switching time differing by a factor of 4. Conversely, if the switching time is held constant, the two cells would differ in switching voltage by a factor of 4. The liquid crystal variable retarder embodiment of FIG. 8 consists of a stack of 4 LC cells such as 52. The cell stack 54 may be controlled by a central controller, such as the retardance controller 50 that manages the optical path delay as well as the liquid crystal response times with proper choice of voltage waveforms. As is known in the art, multilayer stacks of optical components such as the embodiment shown in FIG. 8 benefit from the proper choice and application of antireflection coatings at each optical interface.

If one layer or cell of a multilayer liquid crystal variable retarder has any symmetry-breaking features, where here a layer could be a subset of a cell or could be a whole cell, these features should be alternated or opposed between layers such that the stack as a whole retains favorable symmetry properties. Such symmetry-breaking features can be considered to have a polarity, which refers generally to the notion of whether a symmetry-breaking feature is directed along or in opposition to a test direction. The polarity with which electrodes are connected to a voltage source is one such feature, wherein the notion of polarity is immediate. The liquid crystal alignment direction is another such feature, wherein the notion of polarity can be made concrete by considering the rubbing direction of the uppermost electrode of a liquid crystal cell as seen in a cross-sectional depiction of the cell in a plane that is parallel to the LC directors, such as FIG. 10A. If the rubbing direction is to the right, as shown, we can say the cell has positive polarity, whereas the mirror image cell with the rubbing direction to the left would have negative polarity.

For a conventional antiparallel cell, all liquid crystal molecules tend to be oriented in the same direction, which corresponds to the rubbing direction of an electrode. Such a configuration has a first-order dependence of optical path delay on incident light angle as the incident angle deviates from the normal. If two antiparallel cells are stacked with opposite polarities such that their alignment directions oppose each other, then the first order dependencies of optical path delay on incident light angle are equal and opposite and hence cancel each other out. Therefore, by paying careful attention to the arrangement of polarities of symmetry-breaking features of stacks of liquid crystal cells, it is possible to maintain an incident light angle dependence of optical path delay of second order or higher, as well as other advantageous operating characteristics.

It becomes more critical to shorten the response time of the LC variable retarder if the application demands taking multiple hyperspectral images in succession, as in a hyperspectral movie. Typically, LC variable retarder cells are switched on and then passively allowed to relax. In one embodiment, an LC cell is actively switched between a configuration with a maximal optical phase delay and a configuration with a minimal optical phase delay. This active switching may be implemented in many ways. In one embodiment, each electrode of the pair of electrodes that traditionally surround the LC material has been replaced with a pair of interdigitated electrodes.

Figure 9:
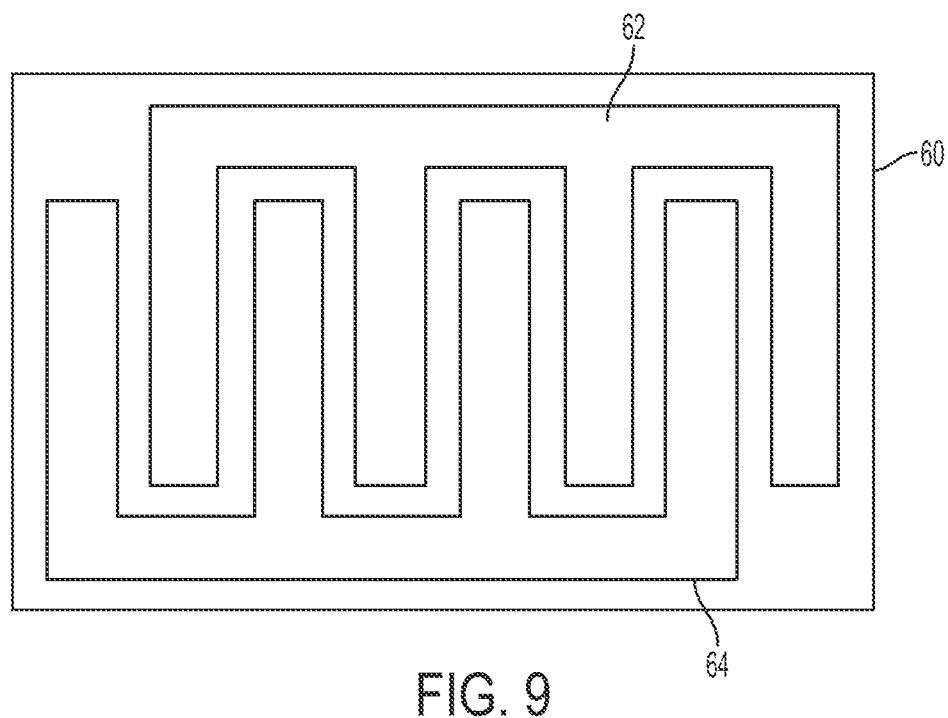
FIG. 9 shows a top view of an electrode panel of one embodiment of a liquid crystal variable retarder, having a pair of electrodes on each side of a single liquid-crystal layer.

FIG. 9 shows one set of interdigitated electrodes 62 and 64 on panel 60 that would replace one planar electrode in a traditional configuration. In this embodiment, panel 60 refers to the optically transparent substrate that surrounds the liquid crystal material to form a liquid crystal cell, and on which the electrode layer resides. Therefore, this panel would be replicated on the other side of the LC material. In one embodiment, the panels that surround the LC material would include a set of electrodes that allows one to switch the electric field between a primarily perpendicular orientation with respect to the substrate, and another pair to switch the electric field to a primarily parallel orientation. By correct application of voltages to each set of electrodes, the LC molecules can rotate, controllably in time, between perpendicular and parallel orientations, or more generally between an orientation providing a minimal optical phase delay and orientation providing a maximal optical phase delay. These embodiments may be referred to as active on and active off embodiments, wherein the LC material is actively switched between states rather than switching the material to an 'on' state and then passively allowing it to relax.

Another aspect of response times is the selection of the LC material itself. When choosing an LC material, one has to balance multiple factors such as optical birefringence, dielectric anisotropy, and rotational viscosity. An LC material with high optical birefringence would result in thinner LC cells that achieve the same optical retardance as a thicker LC cell, with a benefit in lowered response time and/or driving voltage, partially offset by the typically increased rotational viscosity of such high birefringence materials.

An LC material with a high dielectric anisotropy would produce the same response as a lower dielectric anisotropy material but from a lower drive voltage. An LC material with a lower rotational viscosity would have a faster response time than a material with a higher rotational viscosity. As will be discussed in more detail later, material-dependent properties such as optical dispersion and temperature dependence of refractive index and rotational viscosity can be calibrated out of the system performance, but the LC material may still be selected to optimize the system performance post-calibration. In another embodiment, an LC material and/or LC cell preparation may be used to give the LC a larger 'pretilt' angle because this decreases the LC switching time.

In addition to fast response times, high viewing angles increase the usefulness of the hyperspectral imaging component. While hyperspectral imaging systems currently exist, many of them have limited viewing angle due to the angle-dependent properties of the optical filters employed. As used here, 'viewing angle' refers to the level of invariance of the optical phase delay for a given wavelength and a given state of the liquid crystal variable retarder with respect to deviations of the incident light angle from the normal of the LC variable retarder.

Typically, liquid crystal displays (LCDs) are designed as switchable half-wave plates between crossed polarizers that can alternate between light transmitting and light obscuring states. The term 'viewing angle' as used here differs from the conventional usage as applied to typical LCDs, which refers to the angle that a specific contrast ratio is reached between the on and off states. In the embodiments here, the LC variable retarder may function as a high-order waveplate. Because a single point in an image will be formed with a cone of light rays that has a non-zero numerical aperture (NA), each ray of the cone travels at a different incident angle through the LC variable retarder. Consider the difference in optical phase delay at a given wavelength between the ray with the most phase delay and the ray with the least phase delay within the cone of light rays that form a single image pixel. As this difference in phase delay for these two rays approaches π radians, the contrast of the interferogram recorded at this image pixel decreases.

High total optical phase delay is necessary to achieve high spectral resolution at a given wavelength; however, the average variation of the optical phase delay over the incident light angles of the rays corresponding to a single image pixel must be significantly less than π radians. The variation in optical phase delay as a function of angle is proportional to the total optical phase delay, so high spectral resolution imaging is challenging because it combines the above two conflicting requirements of high total optical phase delay with minimal phase delay variation as a function of angle. Therefore, in order to successfully obtain high spectral resolution HSI data, either the imaging NA has to be decreased to decrease the range of angles corresponding to the rays that form an image pixel, or the viewing angle of the liquid crystal variable retarder must be increased. Because decreasing the imaging NA decreases the optical throughput of the system, it is critical to develop techniques that increase the viewing angle to image with high spectral resolution while maintaining high optical throughput.

One particular embodiment of an LC cell that achieves an extended viewing angle uses parallel rubbing layers, known as a pi-cell or optically compensated bend (OCB) cell. The two alignment layers internal to the liquid crystal cell may be rubbed in parallel directions, shown as 72 in FIG. 10B, versus in anti-parallel directions, shown as 70 in FIG. 10A. This causes the top half of the cell to act like the mirror image of the bottom half with respect to a mirroring plane halfway between the bottom and top halves of the cell, incurring similar symmetry advantages as stacking two anti-parallel cells with opposite alignment directions as discussed previously. Light rays traveling at different angles through the cell, shown in FIG. 11, see the same optical path difference to first order in incident angle between ordinary and extraordinary polarizations. This first-order invariance to incident angle arises because first-order deviations in optical path difference have opposite sign in the top and bottom halves of the cell and therefore cancel each other out.

Figure 10A:
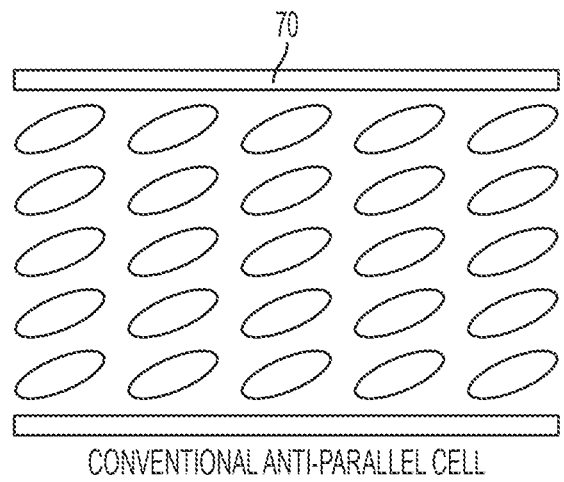
FIGS. 10A and 10B shows a comparison between a standard anti-parallel alignment liquid crystal cell and an embodiment of an optically compensated bend cell.
Figure 10B:
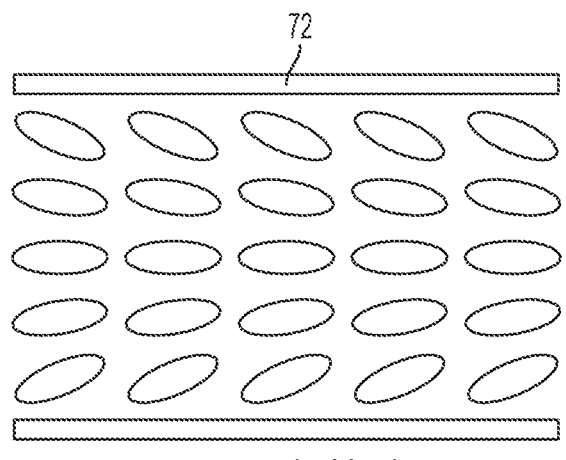
Figure 11:
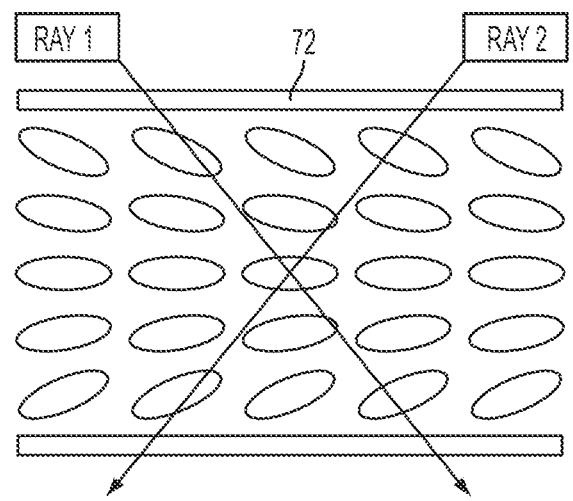
FIG. 11 shows a ray diagram of an optically compensated bend cell.

Another embodiment, the double-nematic cell, involves stacking two conventional anti-parallel cells, such as 70 in FIG. 10A with the LC alignment direction of one rotated 180 degrees with respect to the other, as described previously with reference to FIG. 8. This would perform similarly to the pi-cell except with the top and bottom halves housed in separate cells stacked on top of one another, thereby providing advantages of decreased driving voltage and/or faster response. Other embodiments may include stacks of multiple double-nematic cells, single- or multiple-domain, vertically-aligned (VA) LC cells, and in-plane-switching (IPS) LC cells. Stacking two double-nematic cells with their alignment directions at 90 degrees to each other would provide a liquid crystal variable retarder that could achieve both positive and negative retardances and that would also have a high viewing angle.

When light rays travel through a birefringent medium, they can undergo an effect referred to as 'beam walk-off' in which the wave vector and the Poynting vector are no longer parallel. The embodiment of two layers with opposed symmetry provides a remedy for this, because the walk-off of the first would be corrected by the walk-off of the second. In general, symmetry-preserving arrangements of LC cells in which walk-off is cancelled between two cells or two cell halves with opposite symmetry properties could correct this walk-off. IPS LC cells would not have a walk-off issue because beam walk-off is minimal when the wave vector is perpendicular or parallel to the LC director. If walk-off is not corrected, the image may drift as a function of retardance of the LC variable retarder, creating artifacts on the edges within the image once the Fourier transform was obtained. However, it may still be possible to correct this walk-off algorithmically, neglecting dispersive effects of the liquid crystal, by image registration techniques.

Having demonstrated different embodiments of the structure of the HSI component, the discussion now turns to additional elements and the methods of operating the HSI component, as well as its calibration.

Figure 12:
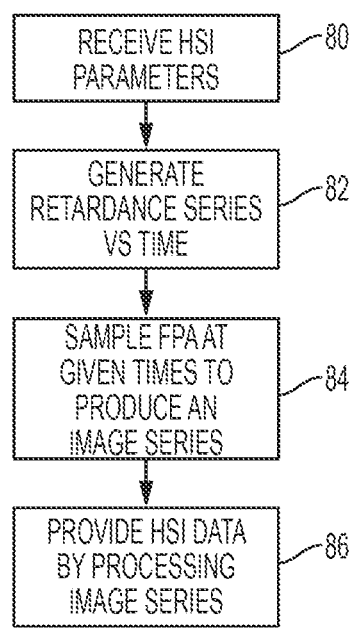
FIG. 12 shows a flowchart of an embodiment of a method of operating a hyperspectral imaging system.

FIG. 12 shows an embodiment of a flowchart of operating the HSI system, which may be better understood if viewed in conjunction with the system diagram of FIG. 3. At 80, the processor 28 in FIG. 3 receives HSI parameters specified by an application running on the host device that describe required features of the hyperspectral image data, or are set by a user or an application running on a standalone HSI camera. The HSI parameters may require, for example, certain hyperspectral image data with a given spectral resolution to be acquired in a given time. Or, they could require a minimal set of hyperspectral image data that would allow distinguishing between specific spectral features known a priori. At 82, the processor 28 determines a number of images N that should be acquired, at which retardances $\Gamma_1$, $\Gamma_2 \ldots \Gamma_N$, and at which times $t_1 < t_2 < \ldots < t_N$. The clock 25 may synchronize the events in the hyperspectral imaging process, such as the image acquisition times, the FPA acquisition times, the FPA trigger times, the changes in retardance controlled by the retardance controller, etc. The processor 28 sends the series of retardances at specified times to the retardance controller. The retardance controller takes the desired retardances at desired times and produces a series of voltages at a series of times. The voltage times may differ from the retardance times, either in number or value. The voltages cause the liquid crystal variable retarder to switch retardances from a first retardance at a first time to a second retardance at a second time, etc. In most cases, switching to the same retardance but within a different time interval will require a different voltage series.

The term voltages as used above refers to a vector where each element of the vector corresponds to one particular electrode potential with response to a reference voltage, such as system ground. In some embodiments, such a vector could be a vector of AC voltages characterized by phase, amplitude and frequency applied to each electrode. By using different frequencies the retardance controller can take advantage of the non-uniform frequency dependence of some liquid crystals, such as the frequency-dependent dielectric anisotropy. The camera processor also can trigger the focal plane array 24 at the times of the retardance time series to sample the focal plane array detector 24 at 84, to produce a series of images at the retardances commanded by the processor.

The retardance extractor 27 can extract the actual retardance at each point in time from either information in the series of images from the FPA 24, a series of partial images from the FPA, selected pixel values from the FPA, single pixel values from the FPA, or from signals from the photo-detector 47 or other light sensor. Retardance extraction can be performed following the method as described in Mitsuo Takeda, Hideki Ina, and Seiji Kobayashi, "Fourier-transform method of fringe-pattern analysis for computer-based topography and interferometry," J. Opt. Soc. Am. 72, 156-160 (1982) to extract the phase delay at each point in the recorded interferograms. The system then has a series of images at known retardances, which the processor 28 then processes to produce the HSI data at 86 to send to the requesting application on the host device or on the camera. Alternatively, if the retardance controller has high enough accuracy, no need exists for the retardance extractor. This is because the acquisition of each image has been synchronized with the timing of the retardance controller and the retardance of each image within the series is sufficiently close to that commanded by the camera processor 28.

Some liquid crystal materials experience a change in sign of the dielectric anisotropy at a certain driving frequency. Driving the material below this frequency causes the molecules to align parallel or perpendicular to the driving electric field, and driving above this frequency causes the molecules to align at 90 degrees with respect to their alignment at the lower frequency. This feature can be used in an active on and active off embodiment by switching the liquid crystal material between two orientations with the choice of drive frequency.

Many characteristics of the hyperspectral imaging system may require calibration. For example, the calculated wavelength of a monochromatic source as a function of position over the FPA may not appear uniform, because the LC cells of the LC variable retarder may have a non-uniform thickness, and there is also a dependence of calculated wavelength on angle of the chief ray at each pixel position. A calibration would take this information into account so that a processed HSI dataset of a monochromatic source, such as a laser, would show a spectral peak at the same wavelength in all image pixels. For example, a laser source may have a wavelength of 532 nanometers. Directing light from the laser source through the HSI component to an FPA and then determining the peak wavelength at a certain point on the FPA by obtaining HSI data of the light from the laser source may result in a peak being detected at 540 nanometers. The application software could be programmed to adjust for this offset. Due to the smoothly varying nature of this offset as a function of position, the calibration process may be performed at a few points or pixel-binned regions in the image plane and then interpolated across the entire image plane, or it could be performed individually at all pixels.

In addition, the index of refraction/dispersion of the LC material, as well as its rotational viscosity and other material parameters, may vary as a function of temperature, and there may be some hysteresis inherent in the switching process. Therefore, the retardance controller should be calibrated and optimized to provide the correct voltages to the electrodes of the LC cells within the LC variable retarder as a function not only of time but also of imaging speed and operating temperature, etc. This calibration of the retardance controller or the above calibration of spectral offsets may be assisted by pointing the HSI component at a fluorescent light bulb or other light source that has multiple known spectral lines. This would be especially useful when optical dispersion is present and multiple spectral peaks are needed to estimate the dispersion.

Referring back to FIG. 1, it can be seen that there is a light source 14 pointing away from the aperture to illuminate the subject being imaged. Referring to FIG. 3, one can also see a second light source, in this embodiment in the form of a laser diode 20 that may illuminate the sensor or the elements internal to the HSI optical path. Alternatively the laser diode 20 may also be a light emitting diode, a superluminescent light emitting diode, a filtered broadband light source, or any other light source of known spectral characteristics. A light source may also just provide general illumination of a scene. A monochromatic outward facing source may be useful as a spectroscopic source, such as for imaging Raman spectroscopy. The light source may consist of broadband outward or inward facing sources used for illumination, such as infrared LEDs for night vision, or one or more LEDs with specific spectral output that combine to form a true "white light" source with flatter spectral output than typical white LEDs.

In the calibration process, the light sources included as part of the device may be used as the calibration light source. The sources should have known spectral characteristics that allow adjustment of the various performance characteristics of the hyperspectral system based upon those characteristics, such that the calculated spectrum at each image pixel accurately reflects the known spectrum of the calibrated source with the highest possible spectral resolution.

The retardance controller is in theory capable of knowing the current state of the LC variable retarder. For example, the LC variable retarder can be initialized in a given state on power-up, or at any point during operation. One possible way to initialize the LC variable retarder is to drive it at a voltage high enough to quickly bring it into equilibrium in its minimum or maximum retardance state. In order for the retardance controller to go from input, such as retardance at specified times, to output, voltages versus time, the retardance controller can use a look-up table, physical model, heuristic algorithm, etc. as a reference. It can also take into account the starting retardance of the liquid crystal variable retarder.

An important aspect of the retardance controller is its ability to produce the correct voltage series for a given retardance series, even if the time series describing when the retardances should be achieved differs. The output of the retardance controller therefore must have a functional dependence on both the retardance series and the time series, not just the retardance series. One should note that the time series is generally ordered but the retardance series is not. If the time intervals between adjacent retardance series members is longer than the liquid crystal variable retarder's relaxation time, the system is said to be adiabatically driven and the voltage series should be relatively independent of the input time series. However, if the time intervals between adjacent retardance series members is less than the liquid crystal variable retarder's relaxation time, the system is said to be dynamically driven because the required voltage series depends strongly on the time series. In other words, the retardance controller is a dynamic retardance controller.

Figure 13:
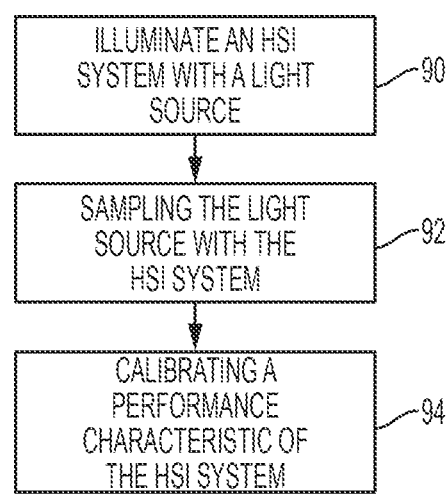
FIG. 13 shows a flowchart of an embodiment of a method of calibrating a hyperspectral imaging system.

FIG. 13 shows an embodiment of a calibration method. At 90, the HSI system is illuminated with a light source. The light source may be a monochromatic inward facing light source, producing light rays that pass directly to the hyperspectral component rather than first reflecting off external scenery. The light source is sampled with the HSI system, and used to calibrate a performance characteristic of the system. This may allow for calibration of the retardance controller or determination of an optimal LC driving waveform, for example. Such a calibration could be performed in a factory setting.

Figure 14:
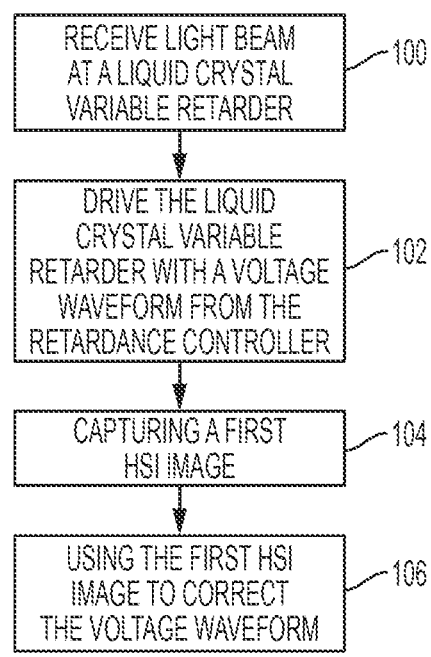
FIG. 14 shows a flowchart of an alternative embodiment of a method of calibrating a hyperspectral imaging system.

The calibration could also be updated during normal use as in FIG. 14 to compensate, for example, for aging of the LC variable retarder. Light is received at the LC variable retarder at 100, and a set of voltages determined by the retardance controller 50 may be used to drive the LC variable retarder at 102. This set of voltages drives the LC variable retarder while hyperspectral image data 104 is captured of the received light 100 which includes light from a calibration source, such as from the laser diode 20 in FIG. 3, or from a nearby fluorescent lamp. Given that the spectral properties of the calibration source are known, it is possible to calculate the time-dependent optical retardance of the LC variable retarder, that is, to measure a calibration retardance, and compare it to the desired retardance that was used by the retardance controller to synthesize the voltage waveform. The retardance controller can then be updated based on the discrepancy between desired and actual retardance to generate a voltage waveform that would more accurately control the retardance as a function of time at 106. For example, the measured center wavelength can be made to more closely approximate a known center wavelength of received light at 100, with better spectral resolution as well, after proper adjustment of retardance controller and the time-dependent driving voltage waveforms it generates. Another option would be to have the retardance versus time characteristic follow a linear trajectory. Any or all of the performance characteristics, calibration information, and properties of the light used for calibration can be stored in look-up tables embedded for example in the memory of processor 28 to allow for comparison and adjustments.

One should note that the HSI system may use calibration data from other sources, rather than generating the calibration data itself. While the calibration data generated in the above self-calibration process may be stored in the memory of the HSI system, the memory may also store calibration data provided with the system, available from other sources, etc. There is no limitation intended nor should any be assumed that the only calibration data available is if the system performs the above-described processes.

In some embodiments it may be advantageous to perform pixel binning, whereby the intensity values recorded at neighboring pixels in a region of the FPA are summed together either directly on the FPA or later in software. If the pixels are binned together at the FPA before they are read out, it is generally possible to increase the frame rate of the FPA. This assumes a fixed maximum communication speed between the FPA and the device that records the data from the FPA, such as the camera processor 28. Varying the number of pixels binned thus allows one to trade-off between spatial resolution and imaging speed, and since there is also a tradeoff between imaging speed and spectral resolution, pixel binning is yet another method to trade off between spectral and spatial resolution and imaging speed. In addition, pixel binning may be important for increasing the signal to noise ratio of an image, especially when signals are weak and minimal spatial resolution is needed. In an extreme limit, all pixels could be binned together, and the embodiment would function as a non-imaging Fourier spectrometer.

Pixel binning may be particularly useful for calibration of various smoothly-varying position-dependent quantities of the FPA such as the position-dependent variation in optical phase delay at a given wavelength and state of the liquid crystal variable retarder. In order to get reliable calibration information it may be necessary to achieve a high signal to noise ratio, whereas not much spatial resolution would be needed because of the smoothly varying nature of the quantities needing calibration. Calibration information across the field of view of the HSI system could be interpolated from the measured results.

The retardance controller can have the ability, in addition to taking into account different time series, to optionally account for different temperatures, because temperature affects the dynamic properties of the liquid crystal material such as dielectric anisotropy, rotational viscosity, and elastic constants, as well as affecting the birefringence. However, this is optional because if the melting point of the liquid crystal material is high enough relative to the operating temperature, the liquid crystal material will not be that sensitive to temperature. The controller can be fully calibrated in the factory and be fully open loop, and if this calibration is dependable enough, the phase reference, in this embodiment, the laser diode 20, is not needed, nor is the retardance extractor 27. However, even if the calibration is fixed in the factory, it may be helpful to have the phase reference to know the actual retardance of the acquired images.

Figure 15:
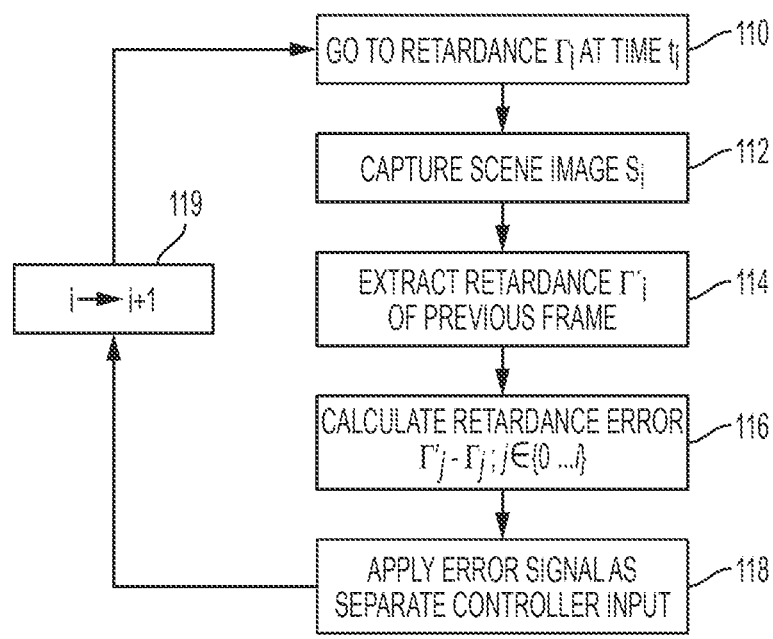
FIG. 15 shows a flowchart of closed-loop control of retardance.

If desired, the retardance controller can update itself between acquisitions of hyperspectral image data as described previously in reference to FIG. 14. It does this by comparing the requested retardance series with the actual retardance series as reported by the retardance extractor 27 or possibly by the processor 28, and updating the retardance controller based on the discrepancies between the two. It is even possible to generate an error signal from the requested and actual retardance series and to use the error signal to drive the liquid crystal variable retarder in a closed loop manner in real time, whereby the error signal is used to compute a correction to the voltages calculated by the open loop retardance controller. FIG. 15 shows an example of such a process.

At 110, the retardance controller 50 of FIG. 3 sets a given retardance $\Gamma_i$ at a time, $t_i$. The scene image $S_i$ is then captured by the focal plane array at 112. The retardance extractor then extracts the retardance $\Gamma'_i$ of the previous frame at 114. The system then calculates the retardance error at 116 by finding the difference between the intended retardance $\Gamma_j$ and the actual retardance $\Gamma'_j$ and applies the error signal as a separate controller input at 118. The system then iterates at 119 and then repeats the process as needed. The system thus operates in a closed loop manner with direct feedback to the retardance controller.

Other modifications and embodiments are possible. In order to decrease imaging time, for example, the system could include an optical bandpass filter, such as a Bayer filter, in front of the HSI component to restrict light hitting the FPA to a known spectral band, allowing subsampling of the interferogram without aliasing. An electronic digital or analog bandpass filter that filtered the signals recorded at each image pixel would achieve the same effect. An optical filter may also increase the spectral resolution if one is imaging a spectral feature that occurs near a sharp cutoff of a filter that has sharp cutoffs. As used here, a sharp cutoff, or transition between the passband and the stopband, is one that is sharper than the full width at half maximum of a spectral peak that would be obtained from a monochromatic source if the filter were not present. Such a filter would yield information as to whether the spectral peak occurred below or above the filter cutoff.

Other types of optical filters or optical components, such as different types of optical films, may also be employed in certain embodiments. For example, a retardance compensation device such as a film may be used to achieve a specific retardance in the "on" or "off" state of the LC variable retarder. The filter or film may also provide chromatic compensation to correct for the dispersive effects of the liquid crystal. Or, standard antireflection coatings may be used on or in the LC cells of the LC variable retarder.

The LC electrodes may consist of graphene, indium tin oxide, or other material with high conductivity and high optical transparency. Especially when considering the multilayer embodiments of the present invention, the light reflected or absorbed from the electrodes must be minimized, and it is therefore advantageous to maintain high optical transparency in the electrode layers.

Many of the embodiments discussed above have assumed the presence of the HSI component in the same system as a traditional camera, with the HSI component having a zero-retardance mode to allow the traditional camera to operate without obtrusion. However, it may be desirable to have the HSI component not in the final focal plane of the FPA nor in close proximity to it, but instead in a conjugate of the focal plane of the FPA and linked to the focal plane of the FPA by one or more sets of relay optics. This would enable an add-on module to be used with existing cell phones or cameras, whereby the add-on would be a hyperspectral component that would control or be controlled by, for example, an existing cell phone or camera, to synchronize the driving of the liquid crystal variable retarder with the acquisition of individual image frames.

Alternatively, in addition to making the device transparent to incoming light, it may also be desirable to make the polarizers completely transparent to incoming light. In this embodiment, when the camera operates as a normal, non-hyperspectral camera, the system does not lose light due to the polarizers. In one embodiment, the system employs a switchable polarizer that can switch between at least two states. One state nominally transmits only one polarization of light and absorbs, reflects or blocks the orthogonal polarization. The other state transmits both polarizations. One can make such a polarizer using anisotropic liquid crystal gels, as set out in H. Ren and S. T. Wu, "Anisotropic Liquid Crystal Gels for Switchable Polarizers and Displays", Appl. Phys. Lett. 81, 1432-1434 (2002). These polarizers also have the desirable properties of low operating voltage, high contrast ratio, broad bandwidth, wide viewing angle, and fast response times.

Another modification that would apply to one or more of the liquid crystal cells in the liquid crystal variable retarder involves the flatness of these cells. The control of the state of the liquid crystal variable retarder across its clear aperture, that is, the portion of the liquid crystal variable retarder through which light passes to the focal plane array 24 or light sensor 47 of FIG. 3, becomes easier when the liquid crystal cells are uniformly thick. The response time at a given point is a nonseparable function of the thickness of a cell as well as the temperature, driving voltages, and other cell properties. Therefore, a given voltage waveform applied to the cell will provoke different responses at points in the cell that differ in thickness. The differences between these responses will also change as a function of temperature. This makes calibration of the retardance controller very difficult, especially if the retardance is only measured at one point in the liquid crystal variable retarder's clear aperture instead of across the clear aperture.

Including spacers in the clear aperture provides one way to make the LC cells uniformly thick. However, the spacers displace the liquid crystal material and therefore they change the retardance variation of the liquid crystal variable retarder at the positions where they are present. This results in their appearance as artifacts in the hyperspectral image data. However, options exist to reduce the significance of these artifacts.

In one embodiment, the spacers have a high aspect ratio, such that the size or diameter of the occluded spot they produce as viewed along the imaging system's optical axis has a small size relative to the spacer height. This causes minimal disruption in the image relative to a low aspect ratio spacer.

Figure 16:
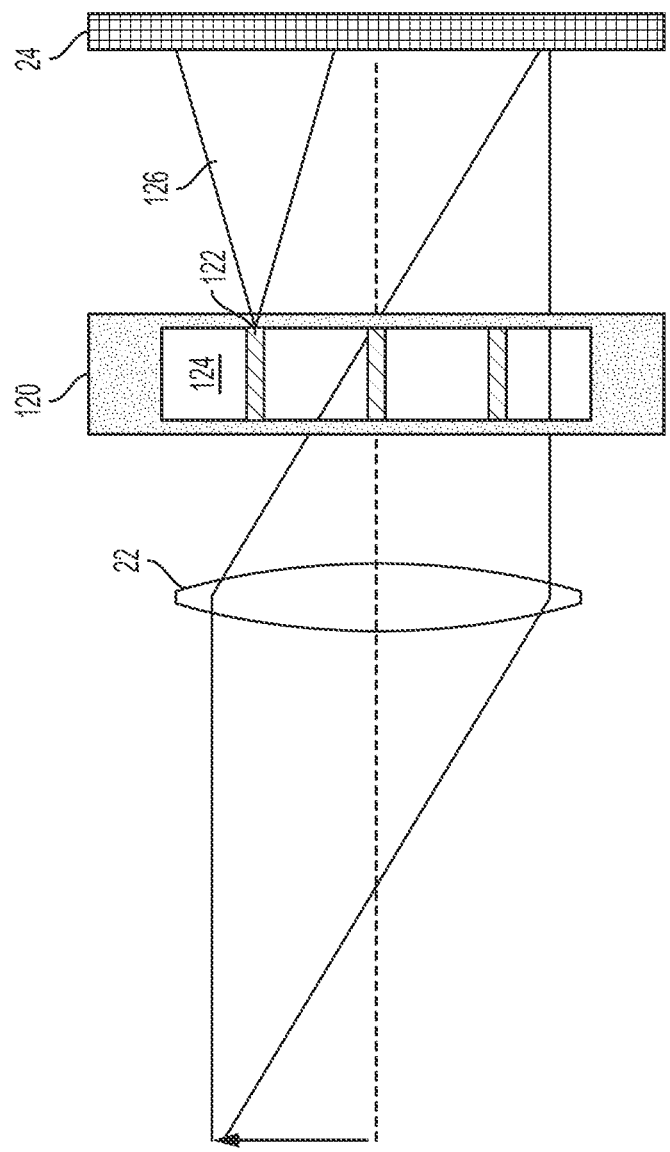
FIG. 16 shows an embodiment of a portion of a hyperspectral imaging system having a liquid crystal variable retarder with spacers within the field of view of the imaging system.

In another embodiment, the liquid crystal cell, the liquid crystal cells, or the liquid crystal variable retarder can move away from the focal plane of the imaging optics within an HSI camera. In fact, the liquid crystal cells of the liquid crystal variable retarder can be individually placed at any location with respect to the imaging optics, as long as they are between the input polarizer and the output polarizer of the HSI system. The liquid crystal cells can be adjacent to each other or they can be separate. One or more can be in a focal plane of the imaging optics, a conjugate focal plane, a Fourier plane, between the imaging optics and the scenery to be imaged, between the imaging optics and the FPA, etc. As long as the cells have sufficiently uniform flatness, the rays that make up a given point in the image can traverse different points of the liquid crystal cells. As these points all have the same thickness within a given cell, these rays all experience the same retardance. Moving the cell away from the focal plane causes a blurring of the occluded spots caused by any spacers within the clear aperture of the cell. FIG. 16 shows an example of this. Note in some embodiments, such as those leveraging principles from the field of computational photography, the FPA 24 may also reside away from a focal plane of the imaging optics. If the focal plane array does not reside in a focal plane of the imaging optics, then in order to blur the spots caused by the spacers as described above, the liquid crystal cell should not reside in the focal plane of the FPA.

In FIG. 16, the liquid crystal cell 120, which could represent one or more liquid crystal cells of the liquid crystal variable retarder, has liquid crystal material 124 sandwiched between the two panels, but also has spacers such as 122. The cell 120 now resides away from the focal plane of the imaging optics, which is where the focal plane array 24 may lie. The light passes through the imaging optics 22 and all rays experience the same thickness of the cell 120 before striking the focal plane array 24. The area in which the spacer 122 may occlude the light is blurred across the region 126. For example, if a spacer with a diameter of 1 micron were placed on a square grid every 10 microns, the spacers would occlude roughly 1% of the clear aperture of the liquid crystal cell in area. If the LC variable retarder cells were directly in the focal plane of the FPA or of the imaging optics, the spacers would create visible artifacts. Moving the cells away from the focal plane spreads and thus dilutes the effect of these artifacts across the spatial extent of the hyperspectral image data.

Figure 17:
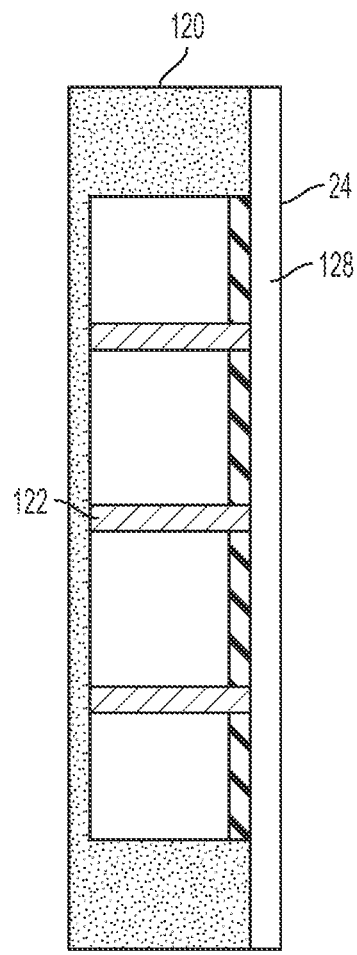
FIG. 17 shows an embodiment of a liquid crystal variable retarder with spacers where the spacers lie between the pixels of a focal plane array.

Another option with regard to spacers and the focal plane array involves building the spacers between the pixels of the focal plane array, as shown in FIG. 17. In FIG. 17, individual pixels 128 of the focal plane array 24 lie between the spacers such as 122 of the liquid crystal cell, which is built on top of the focal plane array. One should note that FIGS. 16 and 17 are merely portions of the hyperspectral imaging system and that the other elements previously discussed such as the electrodes, LC material, wave plates, polarizers, etc. would be included in a full hyperspectral imaging system using these portions.

Figure 18:
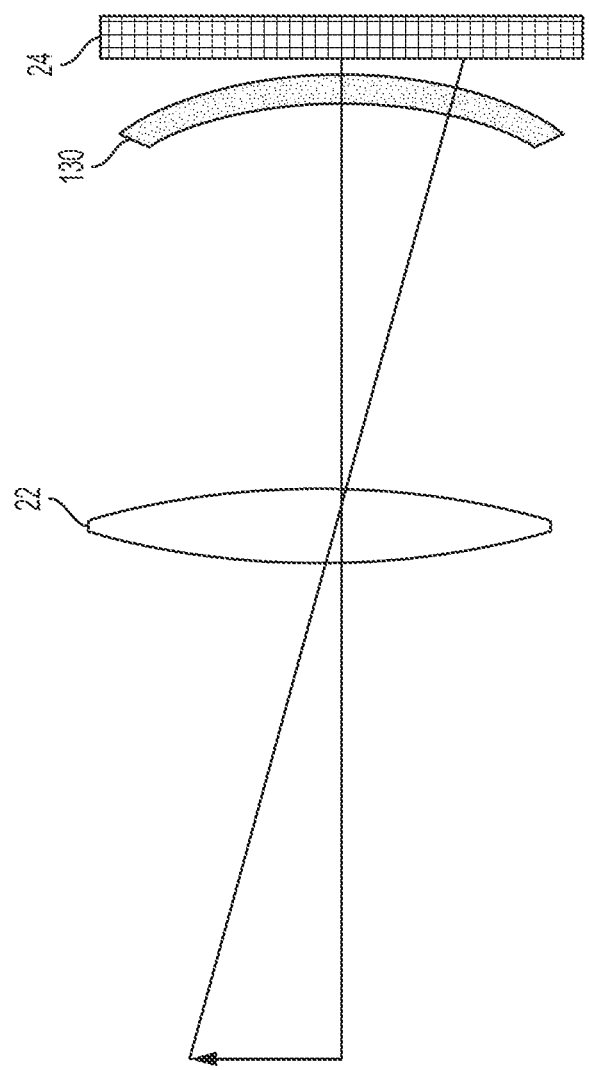
FIG. 18 shows an embodiment of a portion of an imaging system having a curved liquid crystal variable retarder.

Another embodiment involves the use of an LC cell that has uniform thickness but is not itself flat. For wide field of view imaging systems, the central ray of a given field point may enter the hyperspectral camera at a very oblique angle, as shown in FIG. 18. Light entering the imaging optics 22 comes in at an oblique angle. By curving the LC cell 130 prior to the focal plane array 24, the central ray of a given point in the field of view is normally incident on the liquid crystal cell no matter the field point.

As discussed previously, advantages may exist in illuminating the focal plane array with a monochromatic light source or calibration light source, such as that provided by the laser diode 20 in FIG. 3. The system in FIG. 19 allows full illumination of the focal plane array through the same geometric path that the image light takes without occluding the image light. It makes use of a polarizing beam splitter such as 144 instead of the first polarizer of the system. In this embodiment, the laser light from the laser diode 20 through the laser optics 142 would have the vertical (V) polarization entering the polarizing beam splitter through one port and the image light from the scene 140 through the imaging optics 22 would have the horizontal (H) polarization entering the polarizing beam splitter though the second port. The liquid crystal cell rubbing direction would be nominally 45 degrees between the two polarization directions, with the analyzer aligned with either the H or V polarization direction. Optionally, using two focal plane arrays 150 and 164, through two analyzers or output polarizers 148 and 162, and two LC variable retarders 146 and 160, would allow capture of the other polarization of light, nominally increasing the light throughput by 100 percent. This two focal plane array embodiment would be advantageous even in the absence of a calibration light source.

Figure 19:
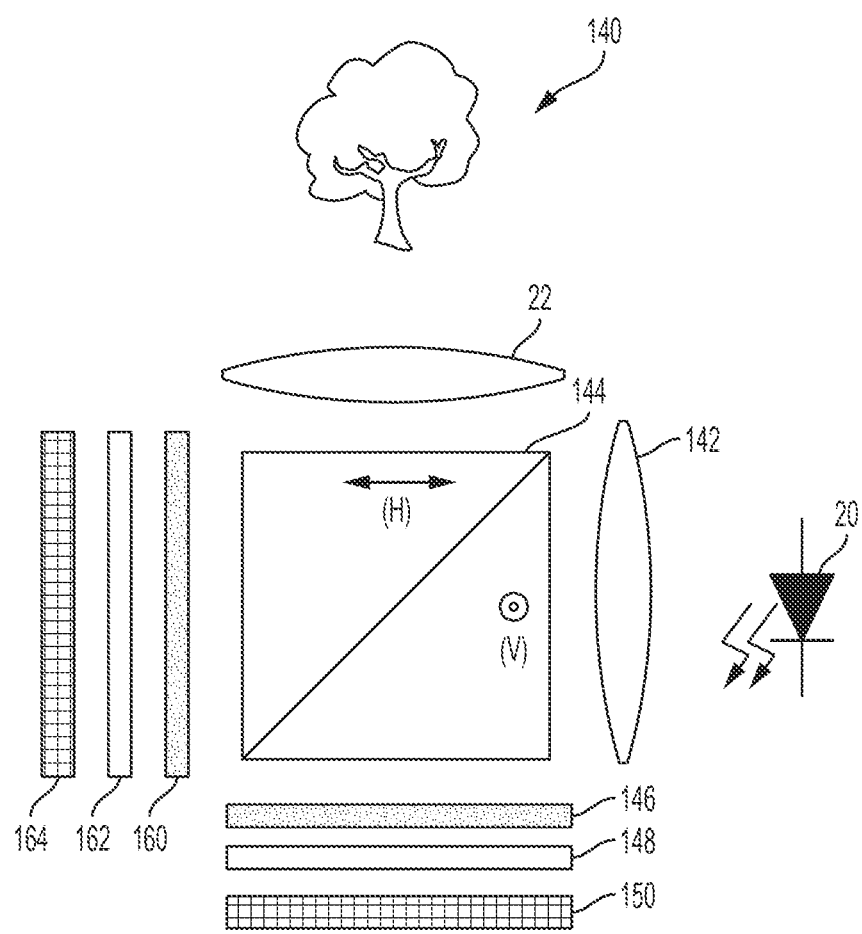
FIG. 19 shows an embodiment of a hyperspectral imaging camera using a polarizing beam splitter to couple in a calibration light source.
Figure 20:
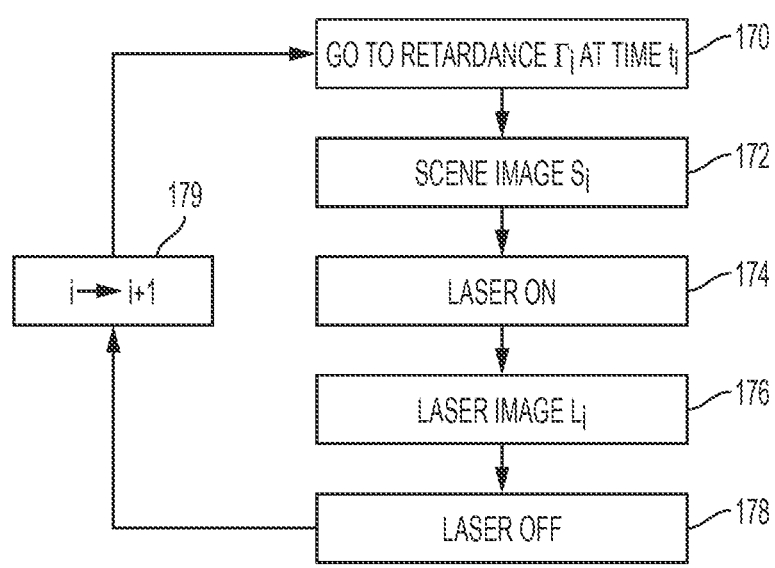
FIG. 20 shows a flowchart of an embodiment of a method of performing an imaging sequence with a calibration light source across a full field of view.

The illumination geometry in FIG. 19 would allow for the retardance to be measured at each point across the full field of view. This information could allow for real-time, closed-loop control as discussed above, or in the analysis of the images to generate the hyperspectral image data. This arrangement would allow the system to interleave frames of image data with frames of light from the monochromatic image source to measure the retardance at each point in time and space. The exposure time used to sample the light source could be reduced if the power of the light source were raised. FIG. 20 shows an embodiment of such a method.

In FIG. 20, the system sets the retardance at retardance $\Gamma_i$, at time $t_i$ at 170. The scene $S_i$ is then captured at 172 to result in one frame of image data. The laser is then turned on at 174, and the image of the laser light is then captured as laser image $L_i$ at 176. The laser is then turned off at 178 and the process repeats at the next settings at 179. In this manner, the system captures the retardance at multiple points in the field of view at many different times to allow for adjustment in the operation of the system, or adjustment in the processing of the data, etc.

Yet another modification involves the control of the liquid crystal variable retarder. As dynamic control of the liquid crystal material can be problematic, it may be advantageous to drive the retarder adiabatically but in a way that allows controlled changes in retardance much faster than the retarder's passive relaxation time. This can be done by significantly decreasing the relaxation or response time of the retarder through the proper choice of voltage waveforms. The response time of the liquid crystal variable retarder can be made very short if the driving voltages are high enough. Therefore it may be useful to drive the liquid crystal variable retarder with a two-component electric field.

As used here, a two-component field has a first component, or a perpendicular component, which causes the liquid crystal material to align perpendicular to the cell's layers and a second component, or a parallel component that causes the liquid crystal to align parallel with the cells' layers. These components can be generated, for example, by combinations of electrode driving potentials to create perpendicular and parallel electric fields, as in FIG. 21, and combinations of driving frequencies that create positive and negative dielectric anisotropies. The parallel field 186 in FIG. 21 may result from positive voltages being placed on electrodes 182 and negative voltage on electrodes 184. The perpendicular field 188 may result from the positive voltages being placed on electrodes 182 in the bottom diagram and negative voltages being place on the electrodes 184. The perpendicular component may then be a perpendicular electric field at a frequency $f_1$ with a positive dielectric anisotropy or a parallel field at a frequency $f_2$ with a negative dielectric anisotropy. The parallel component may then be a parallel field at frequency $f_1$ with positive dielectric anisotropy or a perpendicular field at frequency $f_2$ with a negative dielectric anisotropy.

If only a parallel (or perpendicular) electrical field were used, then the first component $E_A$ would be the field amplitude at frequency $f_1$ ($f_2$), and the second component $E_B$ would be the field amplitude at frequency $f_2$ ($f_1$). Alternatively, one can use only frequency $f_1$ (or only frequency $f_2$) for the electric field. In this case, component $E_A$ would be the parallel (or perpendicular) field and component $E_B$ would be the perpendicular (or parallel) field. The liquid crystal director orientation 190 will adiabatically track the angle theta ($\theta$) given by $\arctan(E_A/E_B)$, and the relaxation time to this angle is given by $\tau = (E^2_C/(E^2_A E^2_B)) t_{relax}$, where $t_{relax}$ is the passive (field-off) relaxation time of the liquid crystal cell and $E_C$ is the critical field response to create a finite distortion at the mid-point of the cell. Orientation changes of the LC director can be made arbitrarily fast by ensuring the relaxation time $\tau$ is much faster than any time between orientation changes of the liquid crystal director. This can be accomplished by making the field components $E_A$ and $E_B$ large enough, but with the correct ratio to reach the desired liquid crystal director orientation and hence the desired retardance of the liquid crystal variable retarder. More generally, one component of a two component field can apply positive torque to rotate the liquid crystal molecules within a cell of the liquid crystal variable retarder to increase the retardance of that cell, and the other component can apply negative torque to decrease the retardance. Simultaneous application of both components causes the liquid crystal molecules to come to equilibrium at an angle set by the ratio of the components, at a rate determined by the magnitude of the components. Thus, a two-component field in principle allows arbitrary control of the director of the liquid crystal molecules and hence arbitrary control of the retardance of a liquid crystal variable retarder.

Other considerations with regard to faster drive times lie in the selection of the liquid crystal material itself. Ferroelectric liquid crystals or polymer network liquid crystals have faster response times. A polymer network liquid crystal material has liquid crystal material embedded with a polymer network.

The methods and devices above may be employed by one of several applications, such as medical imaging, sorting, spectroscopy of material discovered in the field, etc. Each of these may have its own software program, typically referred to as an 'app' in the smartphone world. As mentioned previously, an HSI system may be integrated into many different types of host devices, such as phones, tablets, etc., as well as more traditional lab equipment like microscopes and telescopes.

One specific application that may be enabled by this system is the ability of a user to use the HSI system as a medical diagnostics device, for example for colorimetric readout of home medical diagnostic tests. The user could take one or more HSI datasets of body locations and/or medical diagnostic testing strips. The resultant HSI datasets can be fully or partially processed into diagnostic information using the system's included processing power, or they can be processed in the cloud. With the included communications link, the diagnostic information can ultimately be forwarded to a doctor or laboratory.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A hyperspectral imaging system, comprising:
   a processor configured to receive hyperspectral imaging parameters and to determine a series of retardances at a series of retardance times based on the hyperspectral imaging parameters;
   a hyperspectral imaging component comprising:
   at least one input polarizer, wherein the input polarizer receives and polarizes an incoming beam of light;
   a curved liquid crystal variable retarder arranged adjacent the input polarizer opposite the incoming beam of light to receive the polarized beam of light from the input polarizer and to change polarization of the light to produce wavelength-dependent polarized light;
   an output polarizer arranged to receive the wavelength-dependent polarized light and to convert polarization state information of the light into a form detectable as light intensity; and a retardance controller configured to compute a voltage series that controls retardance of the liquid crystal variable retarder;
   a focal plane array synchronized with the retardance controller and configured to receive the light in a form detectable as light intensity as a function of retardance of the liquid crystal variable retarder and to convert the light to an electrical output signal that represents a series of images, the processor configured to perform transformations of the series of images to hyperspectral image data.

2. The hyperspectral imaging system of claim 1, wherein the liquid crystal variable retarder is curved such that a central ray of any field point is substantially normally incident on the liquid crystal variable retarder.

* * * * *